United States Patent [19]

Holland et al.

[11] Patent Number: 4,477,958
[45] Date of Patent: Oct. 23, 1984

[54] MULTISHELL INERTIAL CONFINEMENT FUSION TARGET

[75] Inventors: James R. Holland, Butler; Robert M. Del Vecchio, Vandergrift, both of Pa.

[73] Assignee: The United States of America as represented by the United States Department of Energy, Washington, D.C.

[21] Appl. No.: 269,286

[22] Filed: Jun. 1, 1981

[51] Int. Cl.³ .................... B23P 17/00; G21B 1/00
[52] U.S. Cl. ......................... 29/423; 29/455 R; 29/460; 376/152; 376/916; 427/6
[58] Field of Search ............. 376/916, 152; 427/6, 427/5; 29/423, 455 R, 460

[56] References Cited

U.S. PATENT DOCUMENTS

| 4,272,320 | 6/1981 | Lindl | 376/916 |
| 4,323,420 | 4/1982 | Masnari et al. | 376/916 |

FOREIGN PATENT DOCUMENTS 2548446  5/1976  Fed. Rep. of Germany.

OTHER PUBLICATIONS

"Laser Fusion–Book Two", 5/80, LLNL, pp. 30–38, 40–48, 50–57, 78–83.
LA-UR-76-2427, 11/76, Farnam et al., pp. 1–5, Figs. 1–11.

Primary Examiner—Harvey E. Behrend
Attorney, Agent, or Firm—John A. Koch; L. E. Carnahan; Michael F. Esposito

[57] ABSTRACT

A method of fabricating multishell fuel targets for inertial confinement fusion usage. Sacrificial hemispherical molds encapsulate a concentric fuel pellet which is positioned by fiber nets stretched tautly across each hemispherical mold section. The fiber ends of the net protrude outwardly beyond the mold surfaces. The joint between the sacrificial hemispheres is smoothed. A ceramic or glass cover is then deposited about the finished mold surfaces to produce an inner spherical surface having continuously smooth surface configuration. The sacrificial mold is removed by gaseous reaction accomplished through the porous ceramic cover prior to enclosing of the outer sphere by addition of an outer coating. The multishell target comprises the inner fuel pellet concentrically arranged within a surrounding coated cover or shell by fiber nets imbedded within the cover material.

6 Claims, 9 Drawing Figures

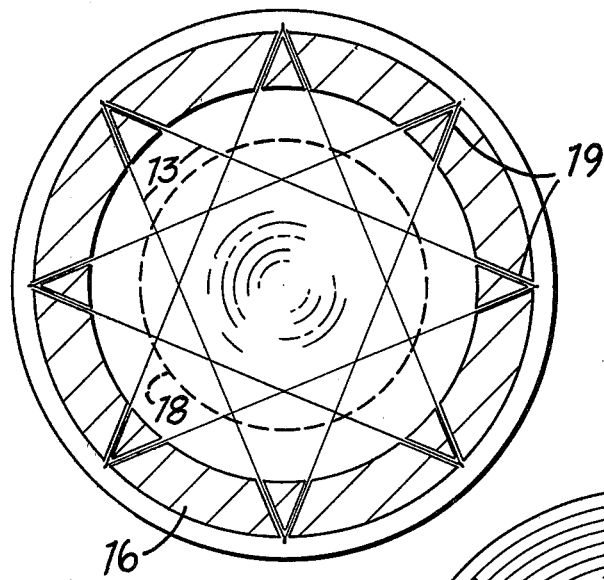
FIG 4
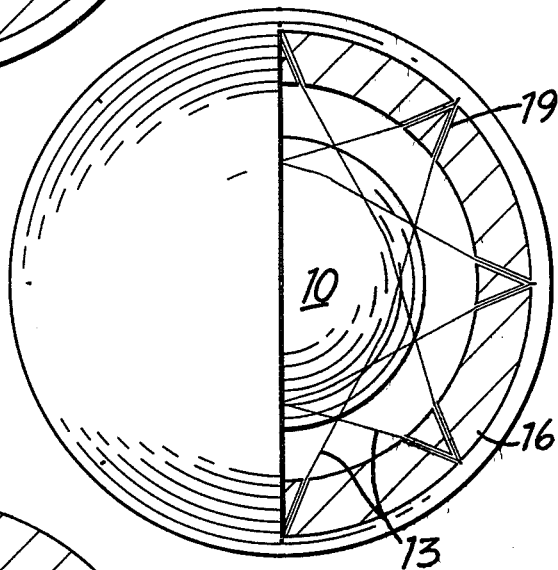
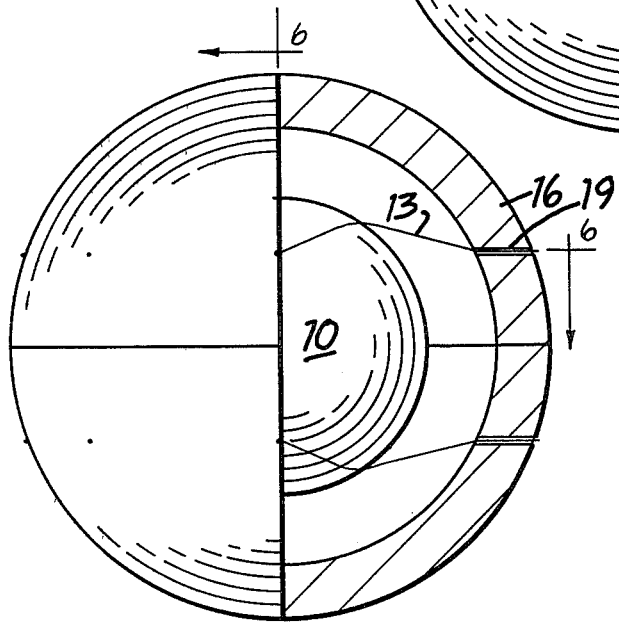
FIG 6
FIG 5

MULTISHELL INERTIAL CONFINEMENT FUSION TARGET

The invention described herein was made in the course of Contract DE-AC08-79DP40086 with the U.S. Department of Energy.

TECHNICAL FIELD

This disclosure relates to fusion targets. It deals particularly with the production of multishell inertial confinement fusion targets. The fuel pellet within such targets is designed to compress isentropically under laser or particle irradiation. When a short pulse at extremely high power density strikes the target containing deuterium-tritium fuel, the resulting plasma is confined briefly by its own inertia. Thermonuclear energy can be released in less time than it takes the fuel pellet to blow apart. However, efficient thermonuclear burn requires that the plasma must remain intact at extremely high temperatures and densities for a time sufficient to allow a large fraction of the nuclei to react. Development of multishell targets has been directed at this problem.

BACKGROUND ART

A general discussion of the production of inertial fusion targets by use of glass microspheres is contained in an article titled "Producing Hollow Glass Microspheres for Inertial Fusion Targets" published by Lawrence Livermore National Laboratory in a report titled "Laser Fusion—Book 2," May 1980, pages 40 through 48. The same report has a discussion of single-shell and double-shell targets in an article titled "Heavy-Ion-Driven Fusion" at pages 50 through 57 and a discussion of coatings for such targets in an article titled "Ultrasmooth Coatings for Microsphere Targets" at pages 78 through 83. Another article titled "Density Diagnosis of Fusion Targets by Neutron Activation" published in this report at pages 30 through 38 discusses the limitations of existing targets and the shifting emphasis to more ablatively driven targets.

Multishell designs of targets are currently being explored in an effort to provide greater control of the ablative reactions required in order to fully utilize longer and more powerful pulses to ultimately implode the central fuel materials in the targets.

A discussion of the production of multishell targets is contained in a paper titled "Fabrication of Multishell Laser Fusion Target" by Farnum and Fries, submitted to a meeting of the Plasma Physics Division of the American Physical Society in San Francisco, Calif., on November 15-19, 1976. This paper discusses the desirability of multishell targets to the attainment of improved efficiency and correspondingly higher yields while accomplishing thermonuclear burn by the use of lower energy laser beams. The paper discusses the production of a multishell target with an outer shell assembled from hemispheres glued together and supporting the fuel pellet by a crosshair support made of two glass fibers. Alternatively, it states that support can be provided by mounting a fuel-filled microballoon on thin plastic films. The described outer shells are produced by coating a hemispherically shaped mandrel with plastic and leaching the mandrel in acid. The plastic hemispheres are then assembled with the crosshair supports for the inner fuel pellet. They are glued at their mating equator surfaces to complete the spherical outer shell.

The requirements of shell sphericity and uniformity in multishell targets are very stringent (within limits of less than 1%). The present invention has arisen from an effort to produce a multishell target in which the outer shell structures have no surface imperfections due to hemispherical seams. Surface irregularities in the assembly may not exceed approximately 200 Angstroms. Gross flaws such as might be caused by inclusion of seams or joint regions in the shell are intolerable in the production of targets meeting these requirements.

DISCLOSURE OF INVENTION

The present method for manufacturing multishell inertial confinement fusion targets utilizes a sacrificial inner shell for molding of a monolithic outer shell structure spaced from an interior fuel pellet. The method involves the production of a pair of hollow hemispheres of sacrificial material. Each hemisphere has an inner diameter greater than the maximum outside dimensions of the fuel pellet. The fuel pellet is concentrically located across the equators of the two hemispheres by a suspension network of fibers within each hemisphere, the ends of individual fibers projecting outwardly through the hemispheres, beyond the outer surface thereof. The hemispheres are joined to one another at their equators. The outer joint surfaces are subsequently smoothed. The joint hemispheres are then coated with a self-supportive porous spherical cover material, which imbeds the outwardly projecting ends of the supports. The sacrificial material forming the hemispheres is then removed through the porous cover. A gas-impervious coating is subsequently deposited over the outside of the porous spherical cover.

The resulting target includes the preformed fuel pellet and a concentric spherical shell surrounding the pellet. A pair of taut open polygonal nets are stretched across two identical small circles parallel to an equator about the shell. They engage the outer surfaces of the fuel pellet to maintain its concentric position relative to the shell surfaces.

It is an object of this invention to provide a practical method of fabricating a multishell target while assuring concentricity of the fuel pellet and accurate sphericity and surface uniformity in the shell structure.

Another object of the invention is to provide a unique means by which the fuel pellet can be accurately positioned within a shell during fabrication and subsequent usage.

Another object is to provide an improved multishell target assembly having an outer shell unmarred by joints or seams.

BRIEF DESCRIPTION OF DRAWINGS

FIG. 4 is a plan view looking at the interior of a single hemisphere with the upper portion broken away at fiber receiving openings;

FIG. 5 is an elevation view of the assembled hemispheres, the right hand half of the view being shown in a vertical section;

FIG. 6 is a plan view of the assembly in FIG. 5 with the right hand portion sectioned along line 6—6 in FIG. 5;

BEST MODE FOR CARRYING OUT THE INVENTION

Multishell inertial confinement fusion targets are being designed and tested for containment of the energy directed to the target so as to assist in maintaining the fuel pellet in an integral condition sufficiently long to permit a large fraction of the nuclei within the pellet to react during thermonuclear processes.

Figure 1:
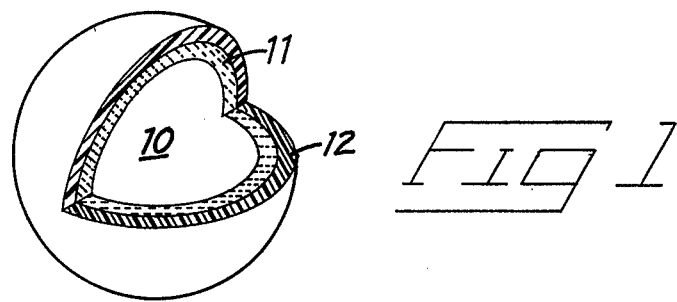
FIG. 1 is an illustrative perspective view of a prior art fuel pellet with portions of the structure broken away.

The fuel pellet 10 utilized in the assembly is shown in FIG. 1 and is basically identical to pellets currently in use for inertial confinement fusion purposes. It comprises a center quantity of deuterium-tritium fuel enclosed with a glass microsphere 11, which in turn is covered by an ablative cover 12.

As an example, the glass microsphere 11 might be a thin glass sphere 3 mm in diameter. The ablative cover might be a constant thickness coating of a polymerized hydrocarbon resin impregnated with tantalum (TaHCO). Other high atomic number materials such as tungsten can be used in place of tantalum in the cover 12. The concentration of tantalum in the resin is selected to reduce preheating of the fuel pellet by the hot electrons.

The hollow inner space within the glass microsphere 11 is filled with deuterium and tritium prior to application of the plastic layer of cover 12. The typical quantities of deuterium and tritium are about $9 \times 10^{-5}$ gram-mole of each. The fuel materials may be introduced into the interior of the glass microsphere 11 by diffusion at temperatures usually below 500° C. The ablative cover 12 can then be applied by vapor deposition.

The production of such spheres is currently known to those skilled in this art and no further details of the inner sphere structure is believed to be necessary to an understanding of the present invention disclosure. This disclosure relates to the support system and means for holding the sphere within a low pressure or void space in the surrounding shell of a multishell target, as well as the manner of forming the surrounding shell structure about a central fuel pellet.

While this disclosure is specifically described with respect to a spherical fuel pellet 10 and spherical outer shells 14 and 15 as shown in FIG. 1, it is to be understood that polygonal and other forms of pellets might be incorporated within an outer shell, or shells, using the method steps described herein. Similarly, the outer shell, or shells, are not necessarily limited to spherical shapes. Therefore, the terms "fuel pellet" and "outer shell" are not to be restricted merely to the spherical shapes shown in the illustrative drawings.

As used in inertial confinement fusion applications, the fuel pellets are designed to compress isentropically under laser or particle irradiation. The multishell design has the potential for high gain in such applications. However, both the fuel pellet and the surrounding shell structure are subject to extreme requirements for manufacturing accuracy. Deviations from shell sphericity and uniformity must not exceed 1% and surface irregularities may not exceed approximately 200 Angstroms. This eliminates the possibility of a shell structure having a seam or joint region.

Figure 2:
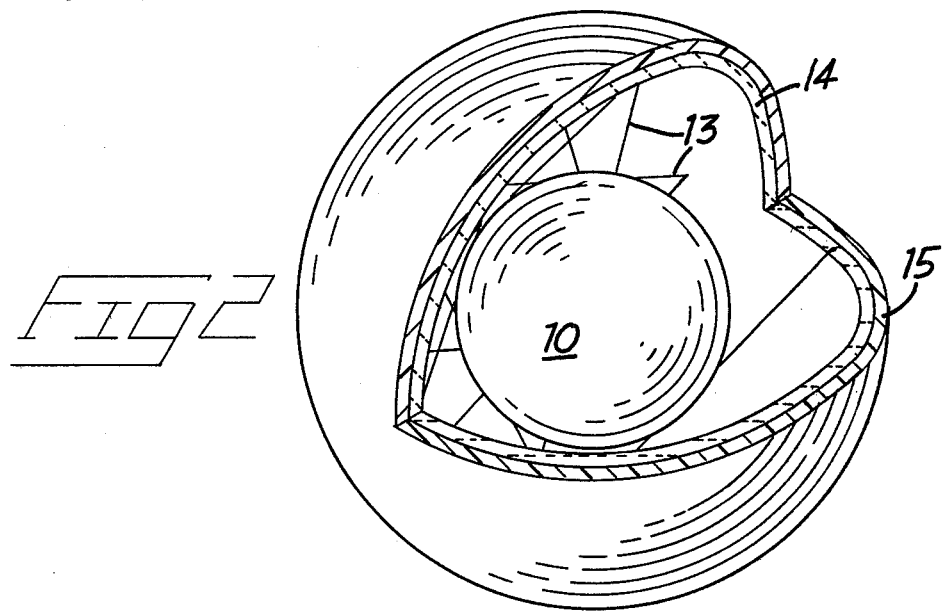
FIG. 2 is a similar perspective view of a multishell target in accordance with the invention.

FIG. 2 illustrates the completed inertial confinement fusion target in accordance with the invention. The fuel pellet 10 is cradled by a pair of spaced fiber nets 13, only one of which is shown in FIG. 2, which engage opposed sides of the center pellet. They locate pellet 10 concentrically with respect to the surrounding shell structure. The outer ends of the net structure are imbedded within a porous ceramic spherical cover 14 which in turn has a coating of gas-impervious material formed about it. The outer coating is indicated by reference numeral 15. The space between the center fuel pellet 10 and the inner spherical wall of cover 14 can be either evacuated or gas-filled at any desired pressure.

Figure 3:
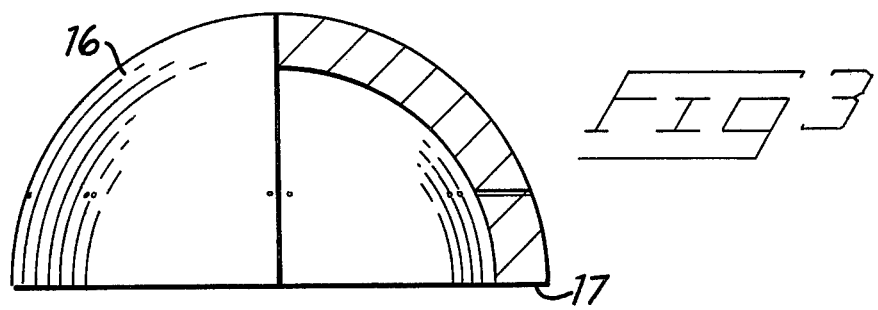
FIG. 3 is a side elevational view of a single sacrificial hemisphere, the right hand side being shown in section.
Figure 7:
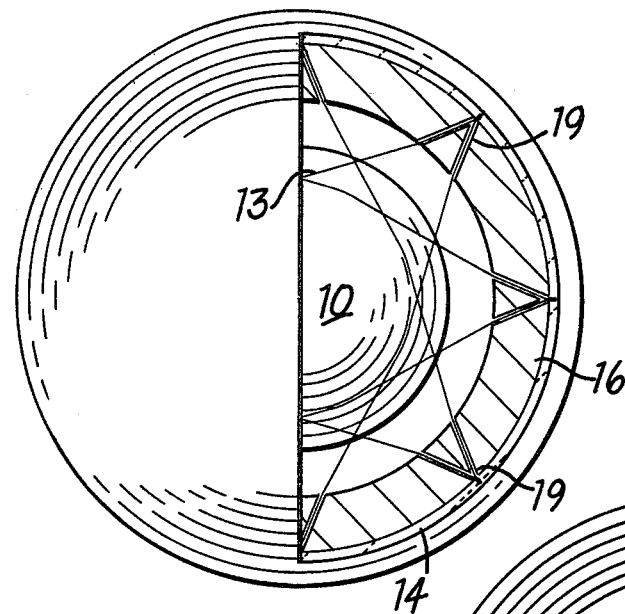
FIG. 7 is a view similar to FIG. 6, showing the addition of the ceramic shell.
Figure 8:
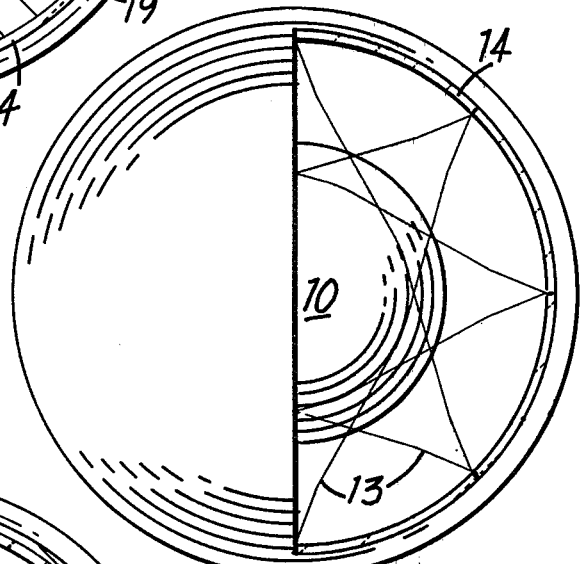
FIG. 8 is a view similar to FIG. 6, after removal of the sacrificial hemispheres.
Figure 9:
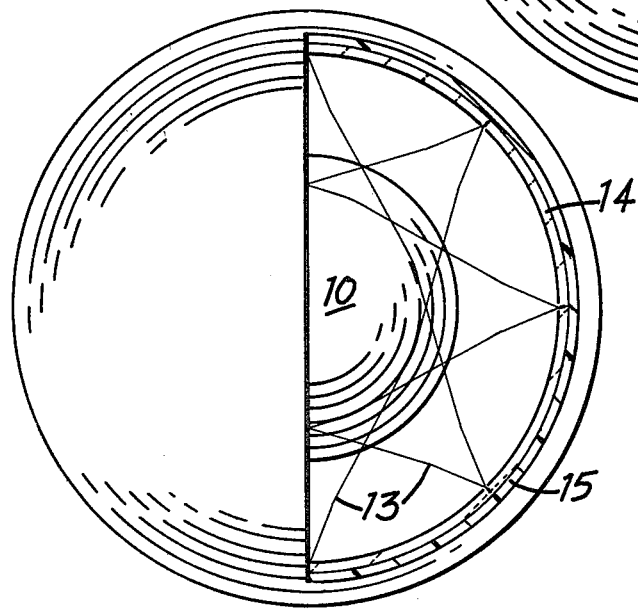
FIG. 9 is a view similar to FIG. 6, showing the final multishell target assembly.

According to this disclosure, shell 14 surrounding the fuel pellet is constructed by use of sacrificial molds. As shown in FIG. 3, each mold comprises a pair of half shells 16 having mating surfaces 17. In the illustrated embodiment, half shells 16 are hemispheres and mating surfaces 17 are equatorial surfaces. The hemispheres 16 are constructed of a metal, such as nickel, which can be removed by reaction with a gaseous reactant at temperatures compatible with the fuel pellet plastic coating 12.

Each hemisphere 16 is drilled about its circumference to provide a plurality of openings 19 to receive and grip the fibers of net 13. The openings 19 extend completely through the hemisphere and are each arranged directionally coincident to the intended projection of the individual fiber extending through it. The plane containing the openings 19 lies in a small circle parallel to the equatorial edge 17 of the hemisphere 16.

The use of hemispherical molds is acceptable in this method because the shell formed by them is sacrificial and temporary. The joint between the two hemispheres at their equators does not result in any discontinuities in the final assembly if the joint outer surfaces are smoothed and perfected prior to further forming of the shell. The inner joint surface between the hemispheres 16 is of no consequence, since it is removed from the assembly along with the sacrificial destruction of the molds.

The hemispheres 16 can be fabricated by pressing or any precision forming technique. They can be constructed of nickel or other materials that can be removed without destruction or damage to either the center fuel pellet or surrounding ceramic cover 14.

With respect to the illustrated example, the hemispheres 16 are 6 mm in outside diameter and have a wall thickness of approximately 0.5 mm. The exterior surface of each hemisphere must be within the required tolerances of the inner shell surfaces which will be formed over them.

The net 13 of fine fibers is next placed in each hemisphere as shown in FIGS. 4 and 5. To properly cradle the fuel pellet 10 within the illustrated net 13, the small circle plane of the openings 19 is spaced from the hemisphere equator by a distance approximately 0.65 of the outer radius of the fuel pellet 10, as best shown in FIG. 5. While quartz fibers are suggested for construction of net 13, fibers of other high modulus materials may be substituted.

It is to be noted that the fibers forming net 13 project through the sacrificial hemisphere 16. The fibers are held tautly in place within the openings 19 such as by tying the ends or glueing. They form an inscribed polygon shown as an octagon (FIG. 4). The outer diameter of the fuel pellet is shown in FIG. 4 by dashed line 18. The taut fibers of the two nets 13 present open center pockets which frictionally center the fuel pellet 10 concentrically within the hemispheres 16 which temporarily support the nets.

To assemble the hemispheres, the fuel pellet is first placed within one hemisphere 16, and is supported by the net 13 formed within it. A second hemisphere 16 is then closed over the first, and the two hemispheres are joined about their equatorial edges 17 such as by glueing. The fibers in the nets 13 engage opposing portions of the outer surface of pellet 10 under some degree of tension, thereby securely holding the inner fuel pellet in place at its desired accurate position.

After the two hemispheres 16 have been joined and fixed to one another, the joint region about the hemispheres is smoothed by filling and by precision grinding and polishing.

A porous layer or cover 14 is then uniformly deposited over the metal sphere. This layer must be self-supportive and rigid. It must also have sufficient porosity to permit escape of the sacrificed mold materials. Its pore size must not be greater than the surface finish tolerance specified for the outer shell. The porous layer or cover 14 will be free of surface imperfections, since it replicates the accurately formed surface of the sacrificial shell.

As an illustration, the cover 14 can be made from a ceramic known as metal-organic-derived-oxide or "MODOX". This ceramic or glass material is made by easily controllable chemical reactions that take place at low temperatures (below 500° C.). It is formed by the molecular mixing and subsequent reaction of soluble metal alkoxides in the presence of water. The ceramic composition may be easily controlled by the choice of metal alkoxides which can be mixed together as liquids before allowing them to react. This ceramic has a high degree of porosity. The pores occupy about 60% of its volume. More significantly, the pore size distribution is sharply peaked about some mean value. This mean value may be selected by suitable control of reaction parameters. Average pore sizes in the range of 40 to 100 Angstroms are easily obtainable with standard deviations of only a few Angstroms. A description of these reactions and resulting properties of MODOX materials can be found in an article titled "A Transparent Porous Alumina" by Yoldas, *The American Ceramic Society Bulletin,* Volume 54, No. 3, March 1975, pages 286-288.

The ceramic cover 14 is uniformly deposited over the nickel sphere. As this is accomplished, the projecting ends of the fibers comprising net 13 imbed within the ceramic material. They are, therefore, permanently anchored for fuel pellet suspension purposes. The suspension system, therefore, remains intact following removal of sacrificial mold 16.

When using a sacrificial mold 16 made of nickel, the carbonyl reaction between nickel and carbon monoxide can be used to remove the nickel in the form of nickel carbonyl. Both the reactant and reaction product are gaseous and the carbonyl reaction proceeds at temperatures of approximately 100° C. The plastic coating or cover 12 about the inner fuel pellet 10 and the ceramic material comprising cover 14 must be inert to the reaction and its products. The temperatures of this reaction are compatible with the plastic coating materials previously described. Other shell materials and gasification reactions for sacrificial removal of spherical mold 16 from within the cover 14 can be substituted where desired.

The material in the sacrificial mold may be recovered and reused. In the case of nickel, the formation of metallic nickel from the carbonyl reaction product gas is easily accomplished.

The composition of the ceramic cover can be chosen to enhance the thermonuclear performance of the interior fuel pellet. For example, a high atomic number metal might be incorporated within the ceramic material.

After the sacrificial mold has been removed from within the shell, any residual gas within the ceramic cover 14 can also be evacuated through its pores. The composition and pressure of gas in the volume between the fuel pellet 10 and the outer shell can be controlled by deposition of the final resin coating 15 in an environment containing the gas mixture at the desired pressure. Since the pressure normally desired within the outer sphere is usually small and possibly is a vacuum pressure, this will not seriously interfere with the vapor deposition process for application of coating 15.

To complete the assembly, coating 15 is deposited uniformly about the outer surfaces of the ceramic cover 14. The resin used in coating 15 can be identical to that used in the cover 12 previously described, or can be a different resin if so desired.

The quartz fibers or glass fibers comprising net 13 should be selected with sufficient tensile strength to withstand the inertial forces which will develop when the target is accelerated in the injection device that positions it for laser or particle irradiation. These forces appear to be relatively small for the inner fuel pellet masses of interest for fusion usage and for fuel target injection systems as presently designed.

It should be emphasized that the method and resulting multishell assembly can be readily applied to other forms of inertial confinement fusion fuel targets which utilize inner spheres or polyhedra which must be suspended and positioned within outer shells of spherical or other shape with near vacuum or very low density annuli between the fuel pellet and the outer shell or shells. Multiple shells can be built concentrically about the described assembly by simply repeating the process steps as discussed in detail above. The present method and resulting assembly is applicable to most situations requiring suspension of a sphere or other form of pellet within a surrounding sphere.

What is claimed is:

1. A method for producing a multishell inertial confinement fusion target, comprising the following steps:
    preforming a fuel pellet having preselected outside dimensions;
    forming a pair of hollow half shells of sacrificial material having inner dimensions greater than the maximum outside dimensions of the fuel pellet;
    concentrically locating the fuel pellet within the two half shells by a network of fibers within each half shell, the ends of the fibers projecting outwardly beyond the outer surface of each half shell;
    joining the half shells to one another to enclose the fuel pellet;
    smoothing the outer surface of the joint between the joined half shells;
    coating the joined half shells with a self-supportive porous cover, the outer ends of said fiber supports being imbedded therein;
    removing the sacrificial material comprising the joined half shells and depositing a gas-impervious coating over the porous cover.

2. A method as set forth in claim 1 wherein said half shells are identical hemispheres.

3. A method as set out in claim 2 wherein the suspension means is produced by the following steps:
- forming a plurality of openings through each hemisphere about an identical small circle parallel to its equator, the openings being equiangularly spaced about the center of the small circle;
- anchoring, in each hemisphere, a plurality of lengths of taut fibers individually across selected pairs of said openings to form an open net across the small circle, with the ends of each length of fiber extending beyond the outer hemisphere surface.

4. A method as set out in claim 3 wherein the lengths of fibers form a net having an open center pocket, whereby the fuel pellet is frictionally centered within the joined hemispheres.

5. A method as set out in claim 1 wherein residual gas in or surrounding the fuel pellet is evacuated through the porous cover prior to the step of depositing a coating over it.

6. A method as set out in claim 1 wherein residual gas in or surrounding the fuel pellet is evacuated through the porous cover prior to the step of depositing a coating over it; and
- depositing the coating over the shell within a gaseous environment having the gas composition and pressure desired within the shell.

* * * * *